United States Patent Office 3,145,109
Patented Aug. 18, 1964

3,145,109
SHORTENING PRODUCT AND METHOD OF MAKING THEREOF
Norman Bratton Howard, Hamilton, Ohio, assignor to The Procter & Gamble Company, Cincinnati, Ohio, a corporation of Ohio
No Drawing. Filed Mar. 27, 1962, Ser. No. 182,955
14 Claims. (Cl. 99—118)

This invention relates to new and improved shortenings. More particularly, it relates to glyceride fat compositions having superior baking qualities as compared with those which have been previously known.

This application is a continuation-in-part of application Serial No. 107,632, filed May 4, 1961, now abandoned.

Ordinary cake baking has customarily been a time consuming and complicated job. Preparing the batter has ordinarily involved a number of mixing steps in which the various ingredients are incorporated into the batter according to involved instructions contained in a recipe. In the most common methods of cake baking, sugar and fat are creamed together, and then the additional ingredients are added in an order that may involve either many separate mixing steps or adding ingredients in a specified order while mixing. It would be a significant improvement to be able to simply mix all of the ingredients from almost any cake recipe together in a single step and bake an acceptable cake.

Dry prepared cake mixes have greatly simplified cake baking operations, but many housewives still prefer to bake their own cakes. Although a housewife simply adds liquid to a dry prepared mix to form a batter, this simplicity of procedure is obtained at the cost of variety. The prepared mixes offer a limited choice of cakes, and it is very difficult to add additional ingredients to a prepared mix without severely affecting the quality of the cake. Therefore, a housewife who prefers to use either a particular recipe or particular ingredients may not choose a prepared mix despite the difficulties associated with preparing a batter from many components.

It has now been found that the addition of certain combinations of particular diglyceride emulsifiers and high temperature batter stabilizers to a fatty triglyceride will produce a shortening which can be used in a wide variety of recipes with the result that acceptable cakes can be achieved with single-stage mixing in which all the ingredients are added to the mixing bowl at the same time. The cakes prepared with these shortenings by this single-stage mixing are not only superior to cakes prepared with conventional shortenings by single-stage mixing, but are often superior to cakes made with conventional shortenings by conventional procedures.

It is well known that triglyceride shortenings can be modified by the incorporation therein of various specially prepared glyceride derivatives such as the mono- and di-glycerides and other glycerides having various combinations of short and long chain fatty acid groups in the molecule. Thus, U.S. Patents 2,132,393–8, issued to Coith, Richardson and Votaw; U.S. Patent 2,132,406, issued to Epstein and Harris; and U.S. Patent 2,132,701, issued to Richardson et al. describe the use of the ordinary mono- and diglycerides in shortening. Several other patents, for example, U.S. Patent 2,614,937, issued to Baur and Lange; U.S. Patent 2,615,159, issued to Jackson; U.S. Patent 2,615,160, issued to Baur; and U.S. Patent 2,882,167, issued to Gehrke et al. disclose glyceride modifications having one or more "short" chain fatty acid groups, such as an acetyl group, in the molecule. However, these prior art disclosures do not teach the instant diglycerides in the combinations provided herein for superior single-stage mixing properties.

Accordingly it is an object of this invention to provide a shortening which has improved cake-baking properties over prior art shortenings.

It is a further object to provide a shortening which can be used to prepare a cake batter with only a single mixing step.

Other objects and advantageous features will be apparent from the following detailed description.

In general, shortenings of this invention comprise a fatty triglyceride having a liquid oil phase. The fatty triglyceride contains from about 1½% to about 16% by weight of the total shortening of material selected from the following diglyceride emulsifiers: (1) 1,3-diglyceride containing a saturated fatty acid chain containing 16 to 22 carbon atoms and a saturated fatty acid chain containing from two to four carbon atoms; (2) 1,2-diglyceride containing a saturated fatty acid chain containing 16 to 22 carbon atoms and a saturated fatty acid chain containing from 12 to 18 carbon atoms; and (3) mixtures of the said 1,3-diglyceride and 1,2-diglyceride containing a saturated fatty acid chain containing 16 to 22 carbon atoms and a saturated fatty acid chain containing from two to four carbon atoms in which the weight of the 1,2-diglyceride does not substantially exceed the weight of the 1,3-diglyceride.

The fatty triglyceride also contains from about 0.25% to about 4% by weight of the total shortening of material selected from the following high temperature batter stabilizers: (1) saturated fatty acids containing from 14 to 22 carbon atoms; (2) the condensation product of either a fatty acid monoglyceride, a fatty acid diglyceride, a mixture of partial fatty acid gycerides, or a monoester of a straight chain aliphatic diol with a saturated fatty acid having from 14 to 22 carbon atoms with a polycarboxylic acid which has from zero to four hydroxy groups, said condensation product having at least one free carboxyl group per molecule (the polycarboxylic acid can contain from three to six carbon atoms, the diols contain from three to five carbon atoms, the fatty acid radicals in the glycerides are acyl chains containing from 14 to 22 carbon atoms, and the condensation products containing said glycerides can have an Iodine Value not higher than 60); (3) the condensation product of a saturated fatty acid containing from 14 to 22 carbon atoms with a polycarboxylic acid having from one to four hydroxy groups, said condensation product having at least one free carboxyl group per molecule (the polycarboxylic acid can contain from three to six carbon atoms); and (4) the condensation product of a saturated straight chain fatty alcohol containing from 14 to 22 carbon atoms with a dicarboxylic acid having no hydroxy groups and containing from three to six carbon atoms, said condensation product having at least one free carboxyl group per molecule.

As will subsequently be seen from the examples, some variation in both directions from the stated limits is possible or even desirable in certain cases and under certain conditions and the term "about" is used herein to allow for such variations.

As used herein, the term "condensation product" is intended to cover the reaction product in which ester groups form as a result of the reaction of the recited components. These condensation products can be made in various ways. For instance, the condensation product of a monoglyceride with a polycarboxylic acid could be made by reacting glycerine, a fatty acid, and the polycarboxylic acid as well as by reacting the monoglyceride and the polycarboxylic acid. In such reactions the ratios of the materials and the conditions are chosen so that the end product will contain the specific ester desired, but there will also be various other compounds produced. It is not intended that this invention should be limited to a particular method of preparation of any material.

In order to conveniently describe the invention in detail, it is necessary to arbitrarily divide the cake baking process into two separate parts. In the first part which comprises the mixing step, one of the major problems concerns the incorporation of air into the batter in the form of small bubbles. The incorporation of air is essentially the production of a foam and the presence of an oily or fatty phase tends to harm the foam building tendency of the protein fraction of the cake. Although it is not desired to be bound by theory, it is felt that the emulsifiers prevent the oily phase from acting as a foam depressant by forming a film at the oil-aqueous phase interface. It is felt that this property of film formation is related to the oil-aqueous phase interfacial tension since a film is formed at that concentration of emulsifier where an addition of emulsifier ceases to decrease the apparent interfacial tension and begins to increase the apparent interfacial tension. (Interfacial tension measurements were made with a duNouy tensiometer for this invention.) This concentration varies with temperature as well as composition of the oily phase for any given emulsifier. As temperature increases the minimum concentration also increases.

Since the effectiveness of the emulsifier depends upon it being dissolved in the liquid oily phase, the upper limit of effective concentration is determined by the solubility of the emulsifier in the liquid oily phase. This requirement that the emulsifier be dissolved in the liquid oily phase means that processing of the shortening may require an elevation of temperature and/or prolonged holding times to dissolve the additives.

Again, although it is not desired to be bound by theory, this film-forming tendency of the emulsifier is apparently related, at least in part, to the crystalline structure of the emulsifier at the temperature of mixing. The preferred structure is in the α-phase structure which is ordinarily unstable in relation to the β or β'-phase structure. These crystalline phases are described in U.S. Patents 2,521,242 and 2,521,243 issued September 5, 1950. While not all materials having an α-phase structure are effective, it has been noted that certain materials which enhance the α tendencies of certain emulsifiers also increase the effectiveness of those same emulsifiers in increasing air incorporation in the mixing step. An example of this type of material is propylene glycol distearate which has been shown to enhance the air incorporation performance of 1-acetyl-3-monostearin although propylene glycol distearate by itself is ineffective.

Many of these additives may have adverse effects on particular properties such as smoke point, or clarity and pourability of fluid shortenings. It is to be understood that a balancing of factors may be indicated. Although the general class of emulsifiers has been hereinbefore described, specific examples include: 1-acetyl-3-monostearin; 1-propionyl-3-monostearin; 1-butyryl-3-monostearin; the preceding compounds in which the stearic acid group is replaced by either a palmitic, arachidic, or behenic acid group; and 1,2-diglycerides in which one fatty acid group is either lauric, myristic, palmitic, or stearic and the other fatty acid group is either a palmitic, stearic, arachidic, or behenic acid group. Mixtures of these can also be used. For example, mixtures of acetyl monostearin and acetyl monobehenin are particularly advantageous. This list should not be taken as in any way limiting the scope of this invention.

The diglycerides employed in this invention are of three types, (1) the 1,3-diglycerides in which one of the acyl groups comprises a carbon chain of from two to four carbon atoms while the other acyl group comprises a chain of from 16 to 22 carbon atoms, (2) the 1,2-diglyceride in which one of the acyl groups comprises a carbon chain of from 12 to 18 carbon atoms and the other acyl group comprises a chain of from 16 to 22 carbon atoms, and (3) mixtures of the said 1,3-diglycerides and the isomeric 1,2-diglycerides which are formed during the preparation of the 1,3-diglycerides. The preparation of these isomeric mixtures is described hereinafter.

The 1,3-diglycerides can be prepared by: (1) partial acylation of a long chain monoglyceride with either the desired short chain acid, its acid chloride, or its acid anhydride under conditions known to those skilled in the art; (2) partial acylation of a short chain monoglyceride with either the desired long chain acid, its acid chloride, or its acid anhydride under conditions well known to those skilled in the art; and (3) interesterification of appropriate mixtures of long chain monoglycerides, diglycerides and/or triglycerides with short chain monoglycerides, diglycerides, and/or triglycerides, either with or without added glycerol under conditions such that the resulting reactant composition will contain approximately one equivalent of long-chain acyl component, one equivalent of short chain acyl component, and one mole of glycerol. This reaction is effectively catalyzed by basic catalysts such as sodium methoxide, quaternary ammonium bases and other catalysts such as those taught in U.S. Patent 2,442,532, Eckey, at column 24, line 18 et seq.

The crude reaction products containing substantial amounts of the desired 1,3-diglycerides can be used as prepared or the desired diglyceride component can be concentrated by application of appropriate methods of fractionation such as molecular distillation, fractional crystallization, and/or solvent partition. The crude 1,3-diglyceride reaction products which are used can contain the isomeric 1,2-diglyceride which is formed during the preparation of the 1,3-diglyceride.

The 1,2-diglycerides can be obtained by several routes. (1) They are the relatively low melting component of superglycerinated, hydrogenated fats and can be isolated by crystallization fractionation. Crystallization fractionation of a superglycerinated, hydrogenated soybean oil in an aliphatic hydrocarbon solvent such as hexane leads to isolation of 1,2-distearin in a 15% yield in a purity of from about 80 to 90%. (2) Thermal isomerization by the method of A. Crossley et al., J. Chem. Soc., p. 700 (1959), of a pure 1,3-diglyceride prepared by the method of U.S. Patent 2,626,952, Lange and Baur, leads to an equilibrium mixture of 1,2- and 1,3-diglycerides in which the 1,2-diglyceride is 40% of the mixture. The desired 1,2-diglyceride is easily isolated by the fractional crystallization procedure described by A. Crossley in the previously mentioned article. (3) Other methods of isomerizing 1,3-diglyceride to an equilibrium mixture with 1,2-diglycerides, such as an acid or base catalyzed isomerization, are equally as advantageous to the preparation of 1,2-diglycerides, yielding mixtures which may be fractionated by crystallization. (4) Specific synthesis may be accomplished by partial acylation of a 2-monoglyceride to yield a mixture of 2-monoglyceride, 1-acyl-2-monoglyceride and 1,3-diacyl-2-monoglyceride. The 1-acyl-2-monoglyceride is separable from this product by fractional crystallization as the desired 1,2-diglyceride. (5) Specific synthesis may also be accomplished by diacylation of a glycerol derivative blocked at a primary hydroxy position. The blocking group is eliminated in a manner such as to yield the diacylated glycerol with the acyl groups in the 1,2-positions. Glycerol derivatives amenable to this type of synthesis include 1-triphenylmethyl glycerol ether, 1-benzyl glycerol ether, and 1-tetrahydropyranyl glycerol ether. The triphenyl methyl and benzyl groups are removed by hydrogenolysis and the tetrahydropyranyl group is removed by boration with boric acid or alkoxy boric acids followed by aqueous hydrolysis of the borate intermediate. Although specific methods of preparation have been given as examples, the invention is not limited to specific methods of preparation.

The second part of the cake baking process involves the actual baking. A major problem in this stage is the retention of gas in the cake in the form of small bubbles until the cake is baked. A second problem is the minimization of shrinkage during and subsequent to baking the cake. These problems can be overcome by the use of one or more high temperature stabilizers. Without both emulsifier and high temperature batter stabilizer the complete baking process cannot be accomplished with single-stage mixing of the batter ingredients.

Four general classes of high temperature batter stabilizers have been heretofore described. Specific materials in these classes include: Myristic acid; palmitic acid; stearic acid, arachidic acid; behenic acid; mixtures of the preceding named fatty acids whether derived from animal, vegetable or marine sources; the condensation product of either malic, tartaric, citric, citramalic, trihydroxy glutaric, mucic, saccharic, or mannosaccharic acid with any of the preceding named fatty acids; the condensation product of either malic, tartaric, citric, citramalic, trihydroxy glutaric, mucic, saccharic, mannosaccharic, malonic, succinic, glutaric, methyl succinic, dimethyl succinic, adipic, tricarballylic, maleic, fumaric, itaconic, mesaconic, citraconic, or aconitic acid with either (a) a monoglyceride, a diglyceride, or a mixture of mono- and diglycerides containing fatty acid radicals of the preceding named fatty acids and, if desired, unsaturated, straight chain fatty acid radicals having from 14 to 22 carbon atoms in sufficient quantities to raise the Iodine Value of the condensation product not higher than 60, or (b) a mono-ester of either propylene glycol, 1,3-propanediol, 1,4-butanediol, 1,3-butanediol, or 1,5-pentanediol with any of the preceding named fatty acids; and the condensation product of either succinic, methyl succinic, dimethyl succinic, glutaric, malonic, adipic, maleic, or fumaric acids with saturated straight chain fatty alcohols containing from 14 to 22 carbon atoms, all of the preceding condensation products being characterized by having at least one free carboxyl group per molecule.

Mixtures of these and other compounds within the scope of the claims can also be used. Examples of mixtures include mixtures of stearic acid and malic palmitate; stearic acid and a condensation product of citric acid and a monoglyceride containing a fatty acid radical of from 14 to 22 carbon atoms; malic palmitate and a condensation product of citric acid and a monoglyceride containing a fatty acid radical of from 14 to 22 carbon atoms, and malic stearate and tartaric distearate.

This condensation product of citric acid and a monoglyceride containing a fatty acid radical of from 14 to 22 carbon atoms, hereinafter will be referred to as citric acid monoglyceride. The term "monoglyceride" is intended to include materials containing as little as one-half monoglyceride with the rest being primarily diglyceride and only a trace of triglyceride. The citric acid monoglycerides can contain mixtures of fatty acid radicals and can be derived from naturally occurring glyceridic materials.

It has been noticed that citric acid monoglyceride may cause shrinkage of the completed baked cake at high levels, but when used in lesser amounts, it is effective. However, since citric acid monoglyceride is effective in producing a finer grain, it is very useful as a component of a mixture of high temperature stabilizers.

The stabilizers hereinbefore described can be prepared as follows:

(1) The fatty acids which function as high temperature batter stabilizers can be readily obtained from hydrogenated glycerides by saponification, acidulation, and isolation procedures. The fatty acid desired determines the choice of glyceridic material. For example, hydrogenated soybean oil would yield a concentrate of stearic acid and hydrogenated rapeseed oil would yield a concentrate of behenic acid.

(2) The second group of high temperature batter stabilizers can be prepared by esterifying polycarboxylic or polycarboxylic hydroxy acids with mono- and diglycerides, and/or mono-fatty acid esters of diols by direct esterification. This reaction is advantageously carried out in a mutual solvent such as dimethylformamide, dimethylacetamide, dioxane, xylene and toluene, either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The stabilizers are isolated by appropriate distillation, and/or washing, and/or crystallization treatments when required to remove solvents, excess reactants, and impurities. It is essential to the functioning of these stabilizers that, in general, the reaction products contain one or more unesterified carboxyl group per molecule.

The polycarboxylic acids employed in the above reactions can be used in the form of their anhydrides or acid chlorides, when these are available. The reaction conditions necessary for using the anhydrides or acid chlorides will hereinafter be described more fully in connection with the third group of stabilizers.

(3) The third group of high temperature batter stabilizers can be prepared by acylating the polycarboxylic hydroxy acids with fatty acid chlorides by reaction in appropriate solvents such as pyridine, quinoline dioxane, dimethylformamide, dimethylacetamide, and mixtures thereof, either with or without addition of lipid solvents such as chloroform, benzene, and ethyl ether. These reactions, and the reactions hereinbefore mentioned in connection with the second group of high temperature batter stabilizers, can be carried out over a wide temperature range of from about 0° C. to about 150° C. or higher as long as undesirable side reactions are avoided. Upon completion of the acylation reaction, the stabilizers are isolated by dilution with an aqueous phase followed by washing, and/or distillation, and/or crystallization when required to remove solvents, excess reactants, and impurities. The method of U.S. Patent 2,251,695, Tucker, is an effective example of such a procedure.

(4) The fourth group of high temperature stabilizers can be prepared by the same procedures used to prepare the second group, using the appropriate fatty alcohols.

Again, although specific examples of methods of preparation have been given, this is not intended to limit the scope of this invention to a particular method of preparation.

Combinations of high temperature batter stabilizers may give better results than a single high temperature batter stabilizer. Mixtures of citric acid monoglyceride with stearic acid exhibit a maximum with respect to volume and mixtures of malic palmitate with stearic acid give better grain than either alone. Mixtures of malic palmitate with citric acid monoglyceride also exhibit a maximum with respect to volume. Other mixtures can also be used.

It will also be understood that some combinations of emulsifiers and high temperature stabilizers are particularly desirable with respect to such considerations as cake volume, grain, taste, smoke point, cost, and availability. Combinations that have been found to be good include for example: acetyl monostearin and stearic acid in ratios of 85/15 and 65/35; acetyl monostearin and behenic acid in a ratio of 85/15; and a 1 to 1 mixture of acetyl monostearin and acetyl monobehenin and either stearic or behenic acid in a ratio of 85/15.

When propylene glycol distearate is used as an additional additive, it is used in an amount greater than about 0.25% by weight of the total shortening and not more than enough to saturate the liquid phase of the shortening.

When the additives of this invention are used in a shortening, the presence of other additives such as conventional monoglyceride emulsifiers is not precluded, since conventional benefits may still be derived by their use. It will be recognized, of course, that the presence of other additives may have an effect on the operation of the additives of this invention and therefore, the desirability of their use will depend upon the results desired.

Any fatty triglyceride material is suitable for use in shortenings of this invention so long as it has a liquid phase and has no qualities which would make it harmful to the health or esthetically undesirable. As far as physical properties are concerned, the material can be entirely liquid at room temperature like salad oils or the material can be a suspension of solids in a liquid such as is described in U.S. Patents 2,521,219 and 2,521,242, issued September 5, 1950, and U.S. Patents 2,815,285 and 2,815,286, issued December 3, 1957. The material can also contain enough solids to form a plastic shortening in which the liquid phase is trapped within a matrix of fat crystals in such a manner that no liquid phase is evident.

The chemical constituents of the fatty triglycerides can also vary widely. For example, the triglycerides can be of animal, vegetable, or marine origin. If desired, the triglycerides can be unhydrogenated or they can be hydrogenated to some degree to improve their keeping properties for a shortening. Other permissible variations include mixing different fatty triglycerides or interesterifying mixtures of fatty triglycerides to give a random distribution of the triglycerides. Low temperature interesterification can be used to form a maximum amount of trisaturates and triunsaturates. An example of a suitable mixture is the addition of a high-melting triglyceride to an oil to form either a plastic shortening or a suspension. Although specific types of triglycerides have been mentioned, this should not be taken as limiting this invention to any specific fatty triglyceride materials.

All types of layer cakes can be made with the products of this invention. White cakes, yellow cakes, chocolate cakes, and many others can be prepared by simply mixing the shortenings of this invention with the other ingredients of the cake in a single mixing step. Therefore, simplification is not at the expense of variety. One of the unique advantages of this invention is that regardless of the ingredients or the detailed instructions for mixing which a recipe contains, substituting the shortenings of this invention for prior art shortenings enables one to combine the ingredients of the recipe in a single mixing step. Simply adding all of the ingredients to a mixing bowl and then mixing is all that is required. Although specific types of cakes have been mentioned, this should in no way be held to limit this invention to the preparation of any specific cake.

The shortenings of this invention also tend to equalize the variations in baking performance which are usually obtained with various kinds of cake flour, thus permitting the use of a wider range of flours than has been heretofore possible with prior art baking shortenings.

The following examples illustrate the practice of this invention and demonstrate the superior results that can be obtained with this invention.

In the following tables batter densities and volumes have been given. In general, a cake made with cottonseed oil and no additives will give a batter density of approximately 1.15 g./cc. and a volume of approximately 925–950 cc. per 400 g. of batter. A decrease in batter density of from about 0.1 to 0.2 g./cc. and an increase in cake volume of about 100 cc. are considered significant improvements. The lower the batter density that is achieved with adequate stabilization, the better the results.

In all of the examples, the additives were dissolved in the shortening material, although this should not be taken as limiting the invention in any way.

The term citric acid monoglyceride as used in the following examples refers to the condensation product of citric acid with a "monoglyceride" containing fatty acids having from 14 to 22 carbon atoms. Unless otherwise described, the specific material used was a commercial product "Seqol 130." The fatty acids present in this product are a mixture of 2.1% myristic, 50.2% palmitic, 44.4% stearic and 3.3% palmitoleic based upon an analysis of the product. Although the products are referred to as citric monoglycerides, they actually are the reaction product of citric acid and a mixture of partial glycerides containing as much as half diglycerides.

The following basic cake recipe was used in obtaining the data contained in the table.

| | G. |
|---|---|
| Cake flour | 95.0 |
| Shortening | 50.0 |
| Granulated sugar | 133.0 |
| Sodium chloride | 1.5 |
| Milk | 120.0 |
| Double-acting baking powder | 5.78 |
| Fresh egg whites | 60.0 |
| Vanilla extract | 2.5 |

The ingredients were mixed for four minutes at 450 revolutions per minute (medium speed) in a conventional household mixer. The batter density was then measured in grams per cubic centimeter. Next, 400 g. of batter was placed in a pan and baked for 25 minutes at 365° F. The baked cakes were removed from the oven and fifteen minutes later, their volume was measured in cubic centimeters.

*Table*

[Refined and bleached cottonseed oil was used as a base oil for the shortening together with varying amounts of the indicated additives. All percentages herein are by weight of the total shortening]

| Example No. | Emulsifier | Percent emulsifier | High temperature batter stabilizer | Percent high temperature batter stabilizer | Batter density, g./cc. | Cake volume, cc. |
|---|---|---|---|---|---|---|
| 1 | 1-propionyl-3-monostearin | 10.0 | Stearic acid | 2.0 | 0.94 | 1,065 |
| 2 | do | 10.0 | | | 1.04 | 895 |
| 3 | 1-butyryl-3-monostearin | 14.0 | Stearic acid | 2.0 | 0.80 | 965 |
| 4 | do | 10.0 | do | 2.0 | 1.13 | 1,045 |
| 5 | do | 10.0 | | | 1.15 | 885 |
| 6 | 1-caproyl-3-monostearin | 10.0 | Stearic acid | 2.0 | 1.15 | 1,040 |
| 7 | do | 10.0 | | | 1.17 | 875 |
| 8 | 1-acetyl-3-monostearin | 2.55 | Malic stearate | 0.45 | 1.08 | 1,040 |
| 9 | do | 3.4 | do | 0.6 | 1.07 | 1,025 |
| 10 | do | 4.25 | do | 0.75 | 1.01 | 1,040 |
| 11 | do | 5.1 | do | 0.9 | 0.97 | 1,040 |
| 12 | do | 6.8 | do | 1.2 | 0.78 | 1,130 |
| 13 | do | 1.95 | do | 1.05 | 1.12 | 985 |
| 14 | do | 2.6 | do | 1.4 | 1.12 | 1,005 |
| 15 | do | 3.25 | do | 1.75 | 1.12 | 985 |
| 16 | do | 3.9 | do | 2.1 | 1.12 | 1,005 |
| 17 | do | 5.2 | do | 2.8 | 1.05 | 1,060 |
| 18 | do | 5.1 | Citric acid monoglyceride | 0.9 | 0.77 | ¹1,100 |

Table—Continued

| Example No. | Emulsifier | Percent emulsifier | High temperature batter stabilizer | Percent high temperature batter stabilizer | Batter density, g./cc. | Cake volume, cc. |
|---|---|---|---|---|---|---|
| 19 | ----do---- | 6.8 | ----do---- | 1.2 | 0.73 | [1] 1,040 |
| 20 | ----do---- | 1.95 | Stearic acid | 1.05 | 0.80 | 1,240 |
| 21 | ----do---- | 2.6 | ----do---- | 1.4 | 0.73 | 1,330 |
| 22 | ----do---- | 3.25 | ----do---- | 1.75 | 0.90 | 1,060 |
| 23 | ----do---- | 0.65 | Behenic acid | 0.35 | 1.13 | 965 |
| 24 | ----do---- | 1.95 | ----do---- | 1.05 | 1.08 | 1,005 |
| 25 | ----do---- | 2.6 | ----do---- | 1.4 | 0.99 | 1,130 |
| 26 | ----do---- | 2.55 | Stearic acid | 0.45 | 1.04 | 905 |
| 27 | ----do---- | 3.4 | ----do---- | 0.6 | 0.74 | 1,405 |
| 28 | ----do---- | 4.25 | ----do---- | 0.75 | 0.73 | 1,425 |
| 29 | ----do---- | 2.55 | Behenic acid | 0.45 | 0.95 | 1,150 |
| 30 | ----do---- | 3.4 | ----do---- | 0.6 | 0.83 | 1,225 |
| 31 | ----do---- | 4.25 | ----do---- | 0.75 | 0.81 | 1,170 |
| 32 | 1:1 mixture of 1-acetyl-3-monostearin with 1-acetyl-3-monobehenin. | 1.7 | Stearic acid | 0.3 | 0.91 | 1,115 |
| 33 | ----do---- | 3.4 | ----do---- | 0.6 | 0.76 | 1,350 |
| 34 | ----do---- | 4.25 | ----do---- | 0.75 | 0.74 | 1,340 |
| 35 | ----do---- | 5.1 | ----do---- | 0.9 | 0.71 | 1,448 |
| 36 | ----do---- | 6.8 | ----do---- | 1.2 | 0.71 | 1,370 |
| 37 | ----do---- | 0.85 | Behenic acid | 0.15 | 1.11 | 965 |
| 38 | ----do---- | 1.7 | ----do---- | 0.3 | 0.95 | 1,225 |
| 39 | ----do---- | 2.55 | ----do---- | 0.45 | 0.87 | 1,140 |
| 40 | ----do---- | 3.4 | ----do---- | 0.6 | 0.91 | 1,130 |
| 41 | 4:1 mixture of 1-acetyl-3-monostearin with propylene glycol distearate. | 6 | Stearic acid | 0.5 | 0.67 | 1,025 |
| 42 | ----do---- | 6 | ----do---- | 1.0 | 0.66 | 1,405 |
| 43 | ----do---- | 6 | ----do---- | 2.0 | 0.77 | 1,095 |
| 44 | ----do---- | 6 | Malic stearate | 0.5 | 0.83 | 1,225 |
| 45 | ----do---- | 6 | ----do---- | 1.0 | 0.79 | 1,585 |
| 46 | ----do---- | 6 | ----do---- | 2.0 | 0.93 | 1,150 |
| 47 | 1-acetyl-3-monostearin | 6 | Octadecyl hydrogen succinate. | 0.5 | 0.70 | [2] 1,330 |
| 48 | ----do---- | 6 | ----do---- | 0.75 | 0.73 | [2] 1,330 |
| 49 | 1,2-distearin | 1.7 | Stearic acid | 0.30 | 0.98 | 1,075 |
| 50 | ----do---- | 3.4 | ----do---- | 0.60 | 0.90 | 1,130 |
| 51 | ----do---- | 5.1 | ----do---- | 0.9 | 0.88 | 1,225 |
| 52 | ----do---- | 6.8 | ----do---- | 1.2 | 0.86 | 1,225 |
| 53 | ----do---- | 4.0 | ----do---- | 2.0 | 0.95 | 985 |
| 54 | ----do---- | 6.0 | ----do---- | 2.0 | 0.90 | 1,025 |
| 55 | ----do---- | 8.0 | ----do---- | 2.0 | 0.95 | 1,025 |
| 56 | 1-acetyl monobehenin | 1.5 | Stearoyl propylene glycol hydrogen succinate. | 0.37 | 0.80 | 1,225 |
|  |  |  | 1,3-distearin hydrogen succinate. | 0.17 |  |  |

[1] These cakes shrank on cooling.  [2] Very coarse grain.

Although the data in the preceding table indicates the performance of shortenings of this invention in white cakes, similar good results are obtained in other types of cakes such as yellow, chocolate, and spice, by the use of appropriate formulations well known to those skilled in the art. Likewise the incorporation of the additives in oils which contain higher melting triglyceride materials so as to form pourable suspensions or plastic shortenings will also result in improved performance.

In addition to the use of cottonseed oil as a fatty triglyceride base oil for the shortenings of this invention, other fatty triglyceride materials having a liquid oily phase such as peanut oil, linseed oil, sunflower seed oil, corn oil, olive oil, rapeseed oil, fish oil and the like or normally liquid fractions obtained from triglyceride oils can be substituted with equivalent results.

The preceding examples are illustrative of the invention and are not to be taken as in any way limiting the scope of this invention.

As can be seen from the examples, the presence of either emulsifier or high temperature batter stabilizer alone is insufficient to enable one to prepare satisfactory cakes by single-stage mixing. A combination of the two, however, gives exceptional results.

What is claimed is:

1. A glyceride shortening composition containing as additives:
   (A) from about 1½% to about 16% by weight of the total shortening of material selected from the group consisting of
      (1) 1,3-diglyceride containing a saturated fatty acid chain containing 16 to 22 carbon atoms and a saturated fatty acid chain containing from two to four carbon atoms;
      (2) 1,2-diglyceride containing a saturated fatty acid chain containing 16 to 22 carbon atoms and a saturated fatty acid chain containing from 12 to 18 carbon atoms;
      (3) mixtures of the said 1,3-diglyceride and 1,2-diglyceride containing a saturated fatty acid chain containing 16 to 22 carbon atoms and a saturated fatty acid chain containing from two to four carbon atoms in which the weight of the 1,2-diglyceride does not substantially exceed the weight of the 1,3-diglyceride; and
      (4) mixtures thereof; and
   (B) from about 0.25% to about 4% by weight of the total shortening of material selected from the group consisting of
      (1) saturated fatty acids containing from 14 to 22 carbon atoms;
      (2) a condensation product having at least one free carboxyl group per molecule of a polycarboxylic acid having from zero to four hydroxy groups and containing from three to six carbon atoms with a material selected from the group consisting of
         (a) a partial fatty acid glyceride containing an average of from one to two fatty acid radicals having from 14 to 22 carbon atoms, but not more than enough unsaturated fatty acid radicals to give a condensation product having an Iodine Value of 60, and
         (b) a monoester of a straight chain aliphatic diol with a saturated fatty acid, said diol containing from three to five carbon atoms and said saturated fatty acid containing from 14 to 22 carbon atoms;

(3) the condensation product of a saturated fatty acid containing from 14 to 22 carbon atoms with a polycarboxylic acid having from one to four hydroxy groups, said polycarboxylic acid containing from three to six carbon atoms and said condensation product having at least one free carboxyl group per molecule;

(4) the condensation product of a saturated straight chain fatty alcohol containing from 14 to 22 carbon atoms with a dicarboxylic acid having no hydroxy groups and containing from 3 to 6 carbon atoms, said condensation product having at least one free carboxyl group per molecule, and (5) mixtures of the preceding materials.

2. The composition of claim 1 wherein the triglyceride base oil of the shortening composition is cottonseed oil and the additives are 1-acetyl-3-monostearin and stearic acid.

3. The composition of claim 2 wherein the glyceride shortening composition is a plastic shortening.

4. The composition of claim 1 wherein the additives are 1-acetyl-3-monostearin and behenic acid.

5. The composition of claim 1 wherein the additives are 1,2-distearin and stearic acid.

6. The composition of claim 1 in which the additives are a mixture of 1-acetyl-3-monostearin, 1-acetyl-3-monobehenin, and stearic acid.

7. The composition of claim 1 in which the additives are a mixture of 1-acetyl-3-monobehenin, 1-acetyl-3-monostearin, and behenic acid.

8. The composition of claim 1 in which the additives are a mixture of 1-acetyl-3-monostearin, 1-acetyl-2-monostearin, 2-acetyl-1-monostearin, and stearic acid.

9. The composition of claim 1 containing as an additional additive propylene glycol distearate in an amount greater than 0.25% and not more than enough to saturate the liquid phase of the shortening.

10. The process of preparing a shortening which can be used in single stage batter mixing, which comprises dissolving into a glyceride shortening composition as additives:

(A) from about 1½% to about 16% by weight of the total shortening of material selected from the group consisting of (1) 1,3-diglyceride containing a saturated fatty acid chain containing 16 to 22 carbon atoms and a saturated fatty acid chain containing from two to four carbon atoms;

(2) 1,2-diglyceride containing a saturated fatty chain containing 16 to 22 carbon atoms and a saturated fatty acid chain containing from 12 to 18 carbon atoms;

(3) mixtures of the said 1,3-diglyceride and 1,2-diglyceride containing a saturated fatty acid chain containing 16 to 22 carbon atoms and a saturated fatty acid chain containing from two to four carbon atoms in which the weight of the 1,2-diglyceride does not substantially exceed the weight of the 1,3-diglyceride; and (4) mixtures thereof; and (B) from about 0.25% to about 4% by weight of the total shortening of material selected from the group consisting of (1) the saturated fatty acids containing from 14 to 22 carbon atoms;

(2) a condensation product having at least one free carboxyl group per molecule of a polycarboxylic acid having from zero to four hydroxy groups and containing from three to six carbon atoms with a material selected from the group consisting of (a) a partial fatty acid glyceride containing an average of from one to two fatty acid radicals having from 14 to 22 carbon atoms, but not more than enough unsaturated fatty acid radicals to give a condensation product having an Iodine Value of 60, and (b) a monoester of a straight chain aliphatic diol with a saturated fatty acid, said diol containing from three to five carbon atoms and said saturated fatty acid containing from 14 to 22 carbon atoms;

(3) the condensation product of a saturated fatty acid containing from 14 to 22 carbon atoms with a polycarboxylic acid having from one to four hydroxy groups, said polycarboxylic acid containing from three to six carbon atoms and said condensation product having at least one free carboxyl group per molecule;

(4) the condensation product of a saturated straight chain fatty alcohol containing from 14 to 22 carbon atoms with a dicarboxylic acid having no hydroxy groups and containing from 3 to 6 carbon atoms, said condensation product having at least one free carboxyl group per molecule; and (5) mixtures of the preceding materials.

11. The process according to claim 10 in which the additives are 1-acetyl-3-monostearin and stearic acid.

12. The process according to claim 10 in which the additives are 1-acetyl-3-monostearin and behenic acid.

13. The process according to claim 10 in which the additives are a mixture of 1-acetyl-3-monostearin, 1-acetyl-3-monobehenin, and stearic acid.

14. The process according to claim 10 in which the additives are a mixture of 1-acetyl-3-monostearin, 1-acetyl-3-monobehenin, and behenic acid.

References Cited in the file of this patent

UNITED STATES PATENTS

| | | |
|---|---|---|
| 2,626,952 | Lange et al. | Jan. 27, 1953 |
| 2,651,646 | Goldsmith | Sept. 8, 1953 |
| 2,813,032 | Hall | Nov. 12, 1957 |
| 2,882,167 | Gehrke et al. | Apr. 14, 1959 |